(12) United States Patent
Feroce et al.

(10) Patent No.: US 12,298,989 B2
(45) Date of Patent: May 13, 2025

(54) DETERMINING DATA SHIFTS USING CHANGEPOINT DETECTION IN TIME SERIES DATASETS

(71) Applicant: Capital One Services, LLC, McLean, VA (US)

(72) Inventors: Simone Feroce, McLean, VA (US); Doug Johnson, McLean, VA (US); Fei Tong, Allen, TX (US); Yingru Xu, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/364,947

(22) Filed: Aug. 3, 2023

(65) Prior Publication Data

US 2025/0045284 A1 Feb. 6, 2025

(51) Int. Cl.
*G06F 16/00* (2019.01)
*G06F 11/34* (2006.01)
*G06F 16/2458* (2019.01)

(52) U.S. Cl.
CPC ...... *G06F 16/2477* (2019.01); *G06F 11/3495* (2013.01)

(58) Field of Classification Search
CPC .......... G06F 16/2477; G06F 11/3495
USPC ...................................... 707/769
See application file for complete search history.

(56) References Cited

U.S. PATENT DOCUMENTS

| 10,872,149 | B1* | 12/2020 | Alexander | G06F 21/566 |
| 2019/0072540 | A1* | 3/2019 | Brun | G01N 33/86 |
| 2020/0310401 | A1* | 10/2020 | Natsumeda | G05B 23/024 |
| 2021/0034994 | A1* | 2/2021 | Stocker | G06N 5/04 |
| 2022/0004913 | A1* | 1/2022 | Nakae | G06N 20/20 |

* cited by examiner

Primary Examiner — Vincent F Boccio
(74) Attorney, Agent, or Firm — Foley & Lardner LLP

(57) ABSTRACT

Methods and systems are described herein for determining data shifts using change point detection in time series datasets. The system receives, from a change point modelling system, a first model and a plurality of change points detected within a time series dataset using the first model. The system generates, for each change point, a second corresponding model that fails to detect a corresponding change point and inputs the time series dataset into the first model and into each second corresponding model. The system determines a performance difference between the first model and each second corresponding model and assigns severity metrics to the change points based on the corresponding performance difference. The system selects a subset of change points based on the severity metrics and determines a cause of each change point of the subset of change points.

20 Claims, 7 Drawing Sheets

DETERMINING DATA SHIFTS USING CHANGEPOINT DETECTION IN TIME SERIES DATASETS

BACKGROUND

Organizations receiving vast amounts of data require significant processing power to analyze this data. Oftentimes, the data contains valuable insights, for example, relating to causes of changes within the data. For example, the data may follow certain patterns but may occasionally exhibit changes that break from the pattern. The data itself may provide insights as to causes of these variations from the patterns. However, uncovering these insights requires significant resources (e.g., people, time, etc.) that may not be available. Thus, many insights are lost due to lack of resources. Initial attempts to process large amounts of data entailed detailed review of the data. Such a review process is unsustainable, as new data is often received at a higher pace than it can be processed. These attempts therefore fail to handle large quantities of data. Thus, a mechanism is desired for prioritizing certain changes within the data and determining causes of those changes.

SUMMARY

Methods and systems are described herein for determining causes of change points in time series datasets. A data shift determination system may be built and configured to perform operations discussed herein. The data shift determination system may receive, from a change point modelling system, a first model that is trained to detect change points within a time series dataset along with the change points within the time series dataset that are detected by the first model. For example, the time series dataset may represent test scores associated with a group of students, and change points within the dataset may represent significant shifts in the test scores. For example, a particular change point may be a shift from scores in the 70's (e.g., 70-79 out of a total possible score of 100) to scores in the 90's (e.g., 90-99 out of a total possible score of 100). The first model may detect each of the change points within the dataset. The data shift determination system may generate a second corresponding model for each change point. In some embodiments, the second corresponding models may fail to detect a corresponding change point but may detect the other change points in the time series dataset. For example, a second corresponding model may fail to detect the particular change point representing the shift from scores in the 70's to scores in the 90's but may detect other change points within the dataset.

The data shift determination system may then input the time series dataset into the first model and each of the second corresponding models to determine how well each model performs. For example, the data shift determination system may determine how well each model describes the dataset. For the particular change point, the first model may describe the dataset more accurately than the second corresponding model, which does not detect the particular change point, and thus the first model may perform better than the second corresponding model. The data shift determination system may then assign a severity metric to each change point based on a performance difference between the first model and a corresponding second model associated with the change point. Larger performance differences may reflect more drastic change points (e.g., shifts from scores in the 70's to scores in the 90's), and smaller performance differences may reflect less drastic change points (e.g., shifts from scores in the 70's to scores in the 80's). Based on the severity metrics, the data shift determination system may select a subset of the change points. For example, the subset may include the change points having the highest severity metrics. For the subset of change points, the data shift determination system may determine a data change causing each change point.

In particular, the data shift determination system may receive, from a change point modelling system, a first model trained to detect change points within a time series dataset. Change points may be locations in the time series dataset where there is evidence of a significant change in the data behavior. A time series dataset may represent scores associated with a group of individuals. As an example, the dataset may represent test scores associated with a group of students. The first model may be trained to optimally model the time series data including all change points. The data shift determination system may also receive the change points detected within the time series dataset using the first model. In some embodiments, each change point may indicate a change in a statistical property within the time series dataset. Each change point may represent a statistically significant change in the test scores over time. For example, a particular student who was receiving scores in the 70's is now receiving scores in the 90's.

In some embodiments, the data shift determination system may generate a second corresponding model for each change point. Each second corresponding model may fail to detect a corresponding change point associated with the second corresponding model. In addition, each second corresponding model may detect other change points in the time series dataset. For example, a second corresponding model may fail to detect a particular change point representing the shift from scores in the 70's to scores in the 90's but may detect other change points within the dataset. For example, each second corresponding model may attempt to model the test scores without accounting for a particular change point. Thus, the second corresponding models may suboptimally model the time series data.

The data shift determination system may input the time series dataset into the first model and into each second corresponding model. This may cause the first model and each second corresponding model to perform change point detection for the corresponding change point within the time series dataset. In some embodiments, the first model and each second corresponding model may attempt to model the time series dataset. For example, the first model and a second corresponding model may attempt to model a portion of the time series dataset corresponding to a particular change point. For the particular change point, the first model may describe the dataset more accurately than the second corresponding model, which does not detect the particular change point, and thus the first model may perform better. The data shift determination system may determine, based on a first model output of the first model and each second model output of each second corresponding model, a first performance level of the first model and a second corresponding performance level of each second corresponding model. The performance level may be measured using a statistical method of quantifying model error. As an example, the data shift determination system may determine how well the first model is able to model the test scores chronologically adjacent to the particular change point as compared to how well the second corresponding model is able to model those test scores.

The data shift determination system may assign, to each change point of the plurality of change points, a corresponding severity metric based on a corresponding performance difference between the first performance level and each second corresponding performance level. For example, the data shift determination system may determine a difference, for each change point, in the ability of the first model to model the test scores surrounding a corresponding change point as compared to how well the second corresponding model is able to model those test scores. Larger performance differences may reflect more drastic change points (e.g., shifts from scores in the 70's to scores in the 90's), and smaller performance differences may reflect less drastic change points (e.g., shifts from scores in the 70's to scores in the 80's). Based on the difference for each change point, the data shift determination system may assign a corresponding severity metric to each change point. The severity metric may be proportional to the difference for each change point. That is, higher severity metrics may be assigned to change points having higher differences between the first performance level and the second corresponding performance level. For example, if one student's test scores change from 70's to 90's and another student's test scores change from 70's to 80's, those changes may have different severity implications.

The data shift determination system may select, based on severity metrics associated with the plurality of change points, a subset of change points of the plurality of change points. For example, the data shift determination system may select a subset of the change points having the highest severity metrics or having severity metrics above a certain threshold. The subset may thus include those change points that are most severe and may need the most immediate attention. For example, the subset may include change points representing the most severe changes in test scores within the dataset (e.g., from 70's to 90's). The data shift determination system may then determine, for each change point in the subset of change points, an indication of a data change causing each change point. For example, the data shift determination system may input the change points in the subset into a comparison modelling system to determine a cause of each change point.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
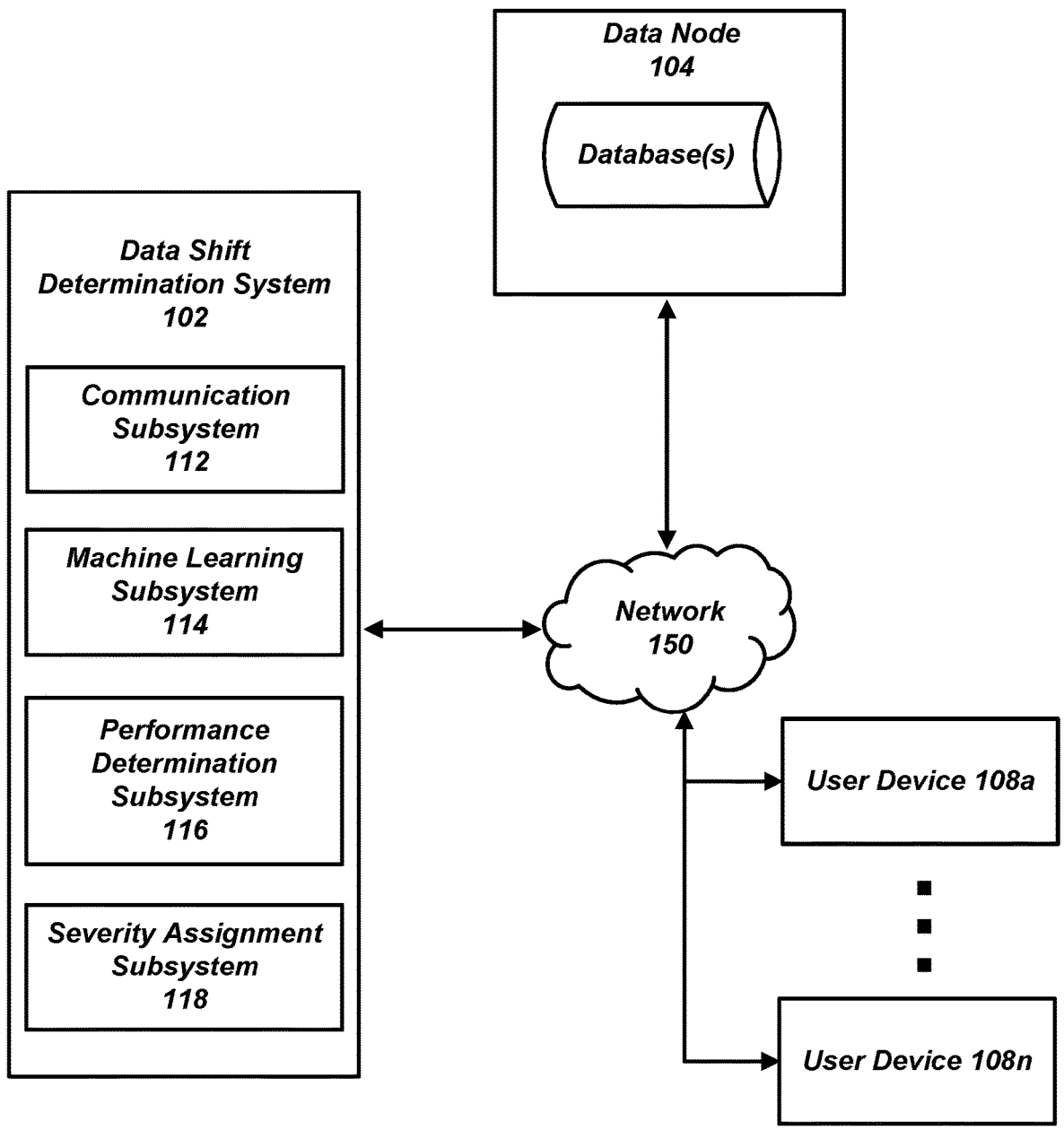
FIG. 1 shows an illustrative system for determining causes of change points in time series datasets, in accordance with one or more embodiments.

FIG. 1 shows an illustrative system 100 for determining causes of change points in time series datasets, in accordance with one or more embodiments. System 100 may include data shift determination system 102, data node 104, and user devices 108a-108n. Data shift determination system 102 may include communication subsystem 112, machine learning subsystem 114, performance determination subsystem 116, severity assignment subsystem 118, and/or other subsystems. In some embodiments, only one user device may be used, while in other embodiments, multiple user devices may be used. The user devices 108a-108n may be associated with one or more users. The user devices 108a-108n may be associated with one or more user accounts. In some embodiments, user devices 108a-108n may be computing devices that may receive and send data via network 150. User devices 108a-108n may be end-user computing devices (e.g., desktop computers, laptops, electronic tablets, smartphones, and/or other computing devices used by end users). User devices 108a-108n may (e.g., via a graphical user interface) run applications, output communications, receive inputs, or perform other actions.

Data shift determination system 102 may execute instructions for determining causes of change points in time series datasets. Data shift determination system 102 may include software, hardware, or a combination of the two. For example, communication subsystem 112 may include a network card (e.g., a wireless network card and/or a wired network card) that is associated with software to drive the card. In some embodiments, data shift determination system 102 may be a physical server or a virtual server that is running on a physical computer system. In some embodiments, data shift determination system 102 may be configured on a user device (e.g., a laptop computer, a smart phone, a desktop computer, an electronic tablet, or another suitable user device).

Data node 104 may store various data, including one or more machine learning models, training data, communications, and/or other suitable data. In some embodiments, data node 104 may also be used to train machine learning models. Data node 104 may include software, hardware, or a combination of the two. For example, data node 104 may be a physical server, or a virtual server that is running on a physical computer system. In some embodiments, data shift determination system 102 and data node 104 may reside on the same hardware and/or the same virtual server/computing device. Network 150 may be a local area network, a wide area network (e.g., the Internet), or a combination of the two.

Data shift determination system 102 (e.g., machine learning subsystem 114) may include or manage one or more machine learning models. For example, one or more machine learning models may be trained to model time series datasets or to detect change points within time series datasets. Machine learning subsystem 114 may include optimal and suboptimal machine learning models. For example, an optimal machine learning model may be trained to optimally model the time series data including all change points, while a suboptimal machine learning model may fail to detect one or more change points within the time series data. Machine learning subsystem 114 may include software components, hardware components, or a combination of both. For example, machine learning subsystem 114 may include software components (e.g., API calls) that access one or more machine learning models. Machine learning subsystem 114 may access training data, for example, in memory. In some embodiments, machine learning subsystem 114 may access the training data on data node 104 or on user devices 108a-108n. In some embodiments, the training data may include entries with corresponding features and corresponding output labels for the entries. In some embodiments, machine learning subsystem 114 may access one or more machine learning models. For example, machine learning subsystem 114 may access the machine learning models on data node 104 or on user devices 108a-108n.

Figure 2:
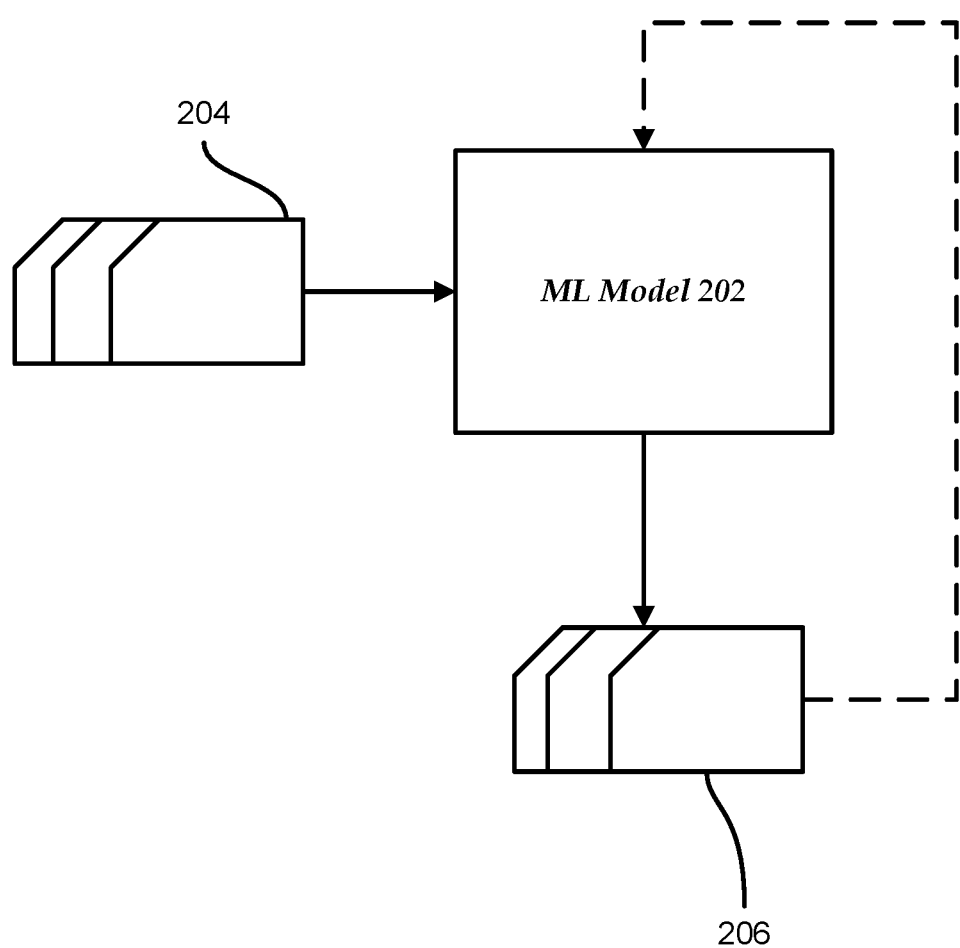
FIG. 2 illustrates an exemplary machine learning model, in accordance with one or more embodiments.

FIG. 2 illustrates an exemplary machine learning model 202, in accordance with one or more embodiments. In some embodiments, machine learning model 202 may be included in machine learning subsystem 114 or may be associated with machine learning subsystem 114. Machine learning model 202 may have been trained to detect a plurality of change points within a time series dataset. In some embodiments, machine learning model 202 may have been trained by a change point modelling system. Machine learning model 202 may represent an optimal or suboptimal machine learning model. Machine learning model 202 may take input 204 and may generate outputs 206. The output parameters may be fed back to the machine learning model as inputs to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

In some embodiments, communication subsystem 112 may identify a plurality of users having a common metric. The common metric may be generated based on a rule. For example, communication subsystem 112 may identify and create a subset or subgroup of a population that meets specific criteria or conditions defined by the rule. The rule may serve as a criterion or set of guidelines to determine which individuals or entities belong to that particular group. Communication subsystem 112 may apply the rule to an entire population and select the members who satisfy the specified conditions. The rule may be based on various factors, such as demographic characteristics, behaviors, preferences, purchase history, geographic location, or any other relevant criteria. For example, the common metric may be a feature or quality that the users have in common. An example of a common metric may be that a group of users are students or that the group of users are students in the same class at the same school. In some embodiments, the rule may identify a group of users that is vulnerable to shifts in data. For example, the rule may select a group of students who are likely to experience a significant increase or decrease in test scores.

Data shift determination system 102 may generate a plurality of time series datasets for the plurality of users having the common metric. Each time series dataset of the plurality of time series datasets may be related to the common metric. For example, the plurality of time series datasets may each represent data relating to different test scores of the group of students. The plurality of time series datasets may each represent other data relating to the group of students. In some embodiments, the plurality of time series datasets may include a time series dataset that will be discussed herein.

Figure 3:
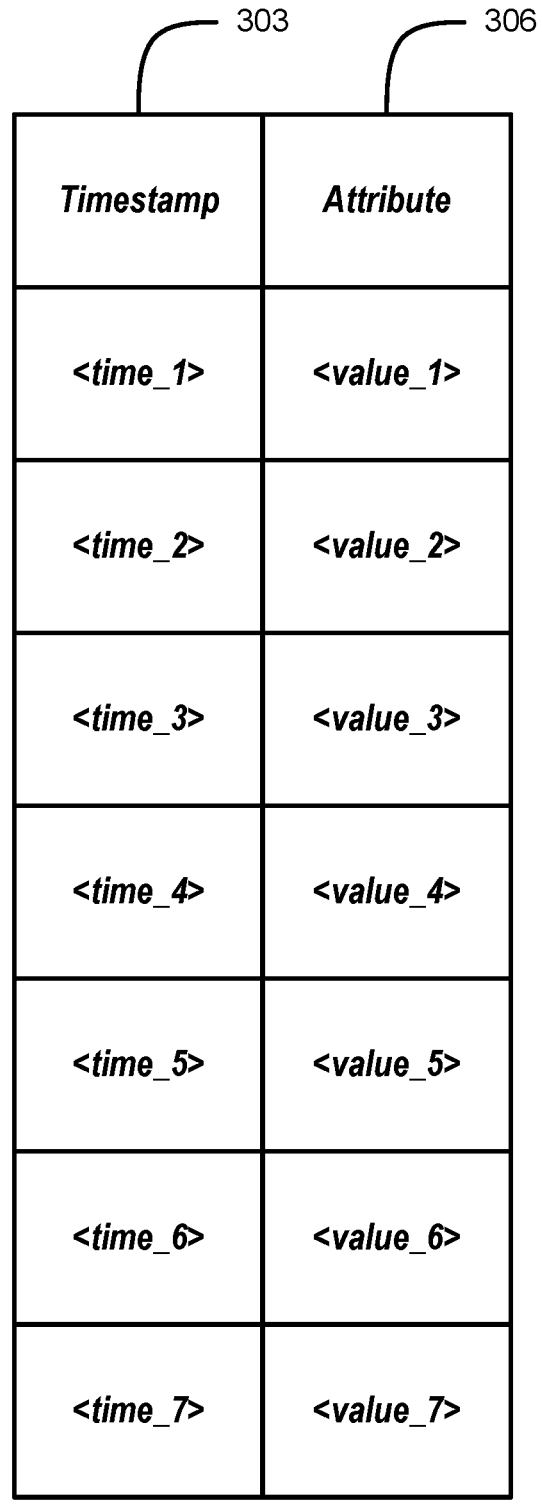
FIG. 3 illustrates a data structure for a time series dataset, in accordance with one or more embodiments.

FIG. 3 illustrates a data structure 300 for a time series dataset, in accordance with one or more embodiments. In some embodiments, data shift determination system 102 may generate multiple time series datasets, including the time series dataset represented by data structure 300. In some embodiments, data structure 300 may be a subset of a larger data structure corresponding to the time series dataset. Data structure 300 may include timestamps 303 and attributes 306. For example, attributes 306 may be values of an attribute at various points in time, e.g., at timestamps 303. For example, data structure 300 may represent test scores associated with students, and attributes 306 may represent the test scores at various timestamps 303. In some embodiments, data structure 300 may include attributes 306 for various users within a group (e.g., a group of students). In some embodiments, data structure 300 may include timestamps 303 within a certain range (e.g., one academic year).

Figure 4:
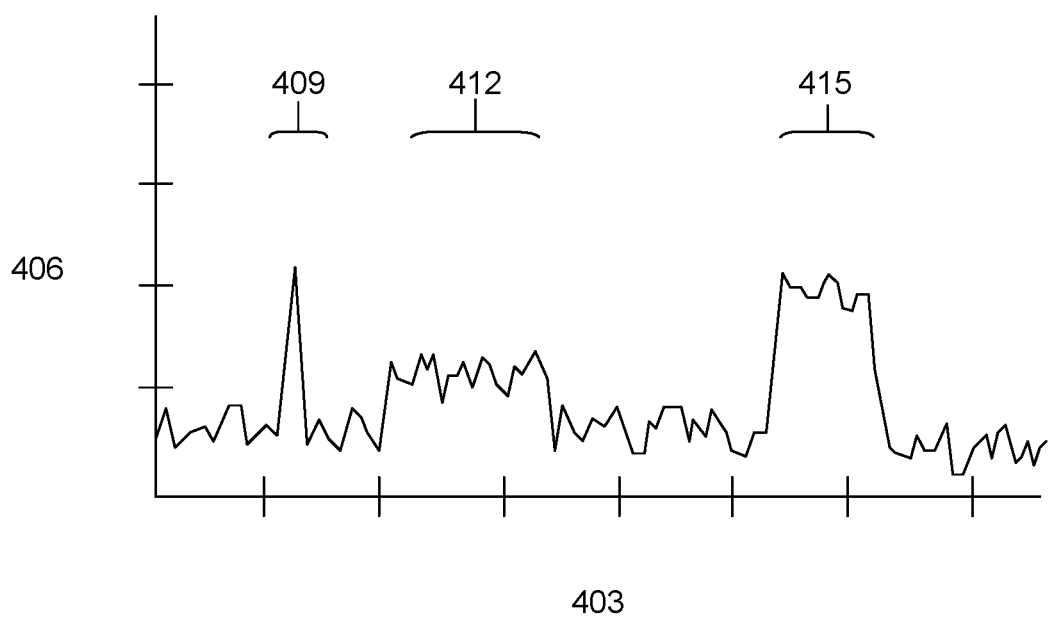
FIG. 4 illustrates a graph of a time series dataset, in accordance with one or more embodiments.

FIG. 4 illustrates a graph 400 of a time series dataset, in accordance with one or more embodiments. Graph 400 may illustrate values 406 of a time series dataset mapped over time 403. In some embodiments, graph 400 is a portion of a larger graph that may extend along the axis of time 403. In some embodiments, values 406 may represent data collected over time for a group of users. For example, values 406 may represent test scores of a group of students, average scores for each test taken by a group of students, or other values associated with a group of students. Graph 400 may include state changes, such as state change 409, state change 412, state change 415, and other state changes. In some embodiments, certain state changes may represent anomalies, change points, or other types of state changes. In some embodiments, state change 412 may represent a shift in test scores from 70's to 80's and state change 415 may represent a shift in test scores from 70's to 90's.

Returning to FIG. 1, data shift determination system 102 (e.g., communication subsystem 112) may receive, from a change point modelling system, a first model trained to detect a plurality of change points within the time series dataset (e.g., data structure 300) and the plurality of change points detected within the time series dataset using the first model. In some embodiments, the time series dataset may represent test scores associated with a group of students, and each change point may represent a statistically significant change in the test scores over time. The change point modelling system may be a Bayesian-based time series change algorithm. The change point modelling system may utilize Bayesian statistics and principles to detect and analyze changes or anomalies in time series datasets. The change point modelling system may identify points or intervals in the time series where there is a significant shift in the underlying data distribution or behavior. In some embodiments, the change point modelling system may utilize Bayesian hypothesis testing to compare competing hypotheses about the presence of a change point. The change point modelling system may assign probabilities to the presence or absence of a change point and updates these probabilities based on the observed data. By evaluating the probabilities, the change point modelling system may determine if there is enough evidence to support the existence of a change point. In some embodiments, the change point modelling system may utilize sequential Bayesian analysis to examine the distribution of model parameters as new data points arrive sequentially. The change point modelling system may calculate the probability of a change point at each time step, and if it exceeds a predefined threshold, a change point may be detected. In some embodiments, the change point modelling system may utilize Bayesian information criterion (BIC) to evaluate the goodness of fit of different models with and without change points. A lower BIC value may indicate a better fit, and the change point modelling system may select the model with the lowest BIC (e.g., the first model) as the one that best describes the data. In some embodiments, the change point modelling system may utilize any other Bayesian modelling techniques to generate the first model and the plurality of change points.

In some embodiments, data shift determination system 102 (e.g., machine learning subsystem 114) may generate, for each change point, a second corresponding model. Each second corresponding model may fail to detect a corresponding change point. In some embodiments, each second corresponding model may detect other change points in the time series dataset. For example, generating the second corresponding model for each change point may involve generating a second corresponding model that detects other change points of the plurality of change points in the time series dataset and that fails to detect the corresponding change point. As an example, each second corresponding model may attempt to model the test scores without accounting for a particular change point. Thus, the second corresponding models may suboptimally model the time series data. For example, a second corresponding model may fail to detect the particular change point representing the shift from scores in the 70's to scores in the 90's but may detect other change points within the dataset. In some embodiments, generating the second corresponding model may involve selecting a model that detects the highest number of the other change points.

In some embodiments, machine learning subsystem 114 may input the time series dataset into the first model and into each second corresponding model. This may cause the first model and each second corresponding model to process the dataset, for example, by attempting to describe the time series dataset or perform change point detection for the corresponding change point within the time series dataset. The first model may optimally describe the time series dataset including the plurality of change points. Each second corresponding model may suboptimally describe the time series dataset due to the failure of each second corresponding model to detect a corresponding change point. Thus, each second corresponding model will not perform as well as the first model. As an example, the first model may accurately describe the test scores associated with students for each timestamp. The first model may detect changes in average test scores over time, anomalies in the test scores, or other abnormalities in the dataset. Each second corresponding model may fail to detect a corresponding change in the average test scores over time, an anomaly in the test scores, or another abnormality in the dataset. For a particular change point, the first model may describe the dataset more accurately than the second corresponding model, which does not detect the particular change point, and thus the first model may perform better than the second corresponding model.

Data shift determination system 102 (e.g., performance determination subsystem 116) may determine a first model output of the first model and each second model output of each second corresponding model. The model outputs may correspond to functions, test scores, or other outputs. Performance determination subsystem 116 may then determine a first performance level of the first model and a second corresponding performance level of each second corresponding model. Performance level may be measured using a statistical method of quantifying model error. In some embodiments, performance determination subsystem 116 may measure performance level by calculating residuals of each model. Performance determination subsystem 116 may receive a first residual value as a first output from the first model and a second corresponding residual value as a second output from each second corresponding model. Residuals may represent the errors or discrepancies between predicted and actual values (e.g., modelled values versus actual values of test scores). Positive residuals indicate that the model overestimated the actual value, while negative residuals indicate an underestimation. Residuals close to zero may indicate accurate performance.

In some embodiments, performance determination subsystem 116 may utilize other statistical methods of quantifying model error to determine model performance. For example, performance determination subsystem 116 may utilize Mean Squared Error (MSE), which measures the average squared difference between the predicted values and the actual values. A lower MSE may indicate a better fit performance by a model. Performance determination subsystem 116 may utilize Root Mean Squared Error (RMSE), which is derived from MSE by taking the square root of the average squared difference. A lower RMSE may likewise imply better model performance. In some embodiments, performance determination subsystem 116 may utilize Mean Absolute Error (MAE), which represents the average absolute difference between the predicted values and the actual values. A lower MAE may indicate better model performance. In some embodiments, performance determination subsystem 116 may utilize log loss, for example, for binary or multi-class classification datasets. Log loss may measure the performance of models by penalizing incorrect predictions. Lower log loss may indicate better model performance. In some embodiments, performance determination subsystem 116 may utilize a combination of the aforementioned measures of model error or may utilize other measures of model error.

Performance determination subsystem 116 may determine, for the first model and each second corresponding model, a corresponding performance difference. The performance difference may measure a discrepancy between a first performance level of the first model and a second corresponding performance level of each second corresponding model. For example, if performance is measured by residuals, determining the corresponding performance difference may involve receiving a first residual value as a first output from the first model and a second corresponding residual value as a second output from each second corresponding model and determining the corresponding performance difference for each second corresponding model by comparing the first residual value with each second corresponding residual value. For example, for a particular change point, performance determination subsystem 116 may compare the first residual value of the first model with a second residual value received from a second corresponding model. The performance difference may be the difference between the first residual value and the second residual value. For other measures of performance, performance determination subsystem 116 may compare the measures to determine the performance difference of each second corresponding model. Larger performance differences may reflect more drastic change points (e.g., shifts from scores in the 70's to scores in the 90's) and smaller performance differences may reflect less drastic change points (e.g., shifts from scores in the 70's to scores in the 80's).

Data shift determination system 102 (e.g., severity assignment subsystem 118) may assign severity metrics to the plurality of change points. Each severity metric may represent an impact of a corresponding change point on the ability of a second corresponding model (which fails to detect the corresponding change point) to accurately represent the dataset. Each severity metric may be assigned to a corresponding change point of the plurality of change points based on the corresponding performance difference. For example, if one student's test scores change from 70's to 90's and another student's test scores change from 70's to 80's, those changes may have different severity implications. For a particular change point, the magnitude of the assigned severity metric may be proportional or otherwise related to the performance difference between the first model and a second model corresponding to the particular change point. For a higher performance difference, a higher severity metric may be assigned. For a lower performance difference, a lower severity metric may be assigned. In some embodiments, a group of students that experienced a drastic shift in test scores at a point in time may receive a high severity metric for that change point. In some embodiments, if the group experienced a smaller shift in test scores at another point in time, that change point may receive a lower severity metric. For example, as shown in FIG. 4, state change 412 may represent a smaller shift in test scores, while state change 415 may represent a more drastic shift in test scores.

Figure 5:
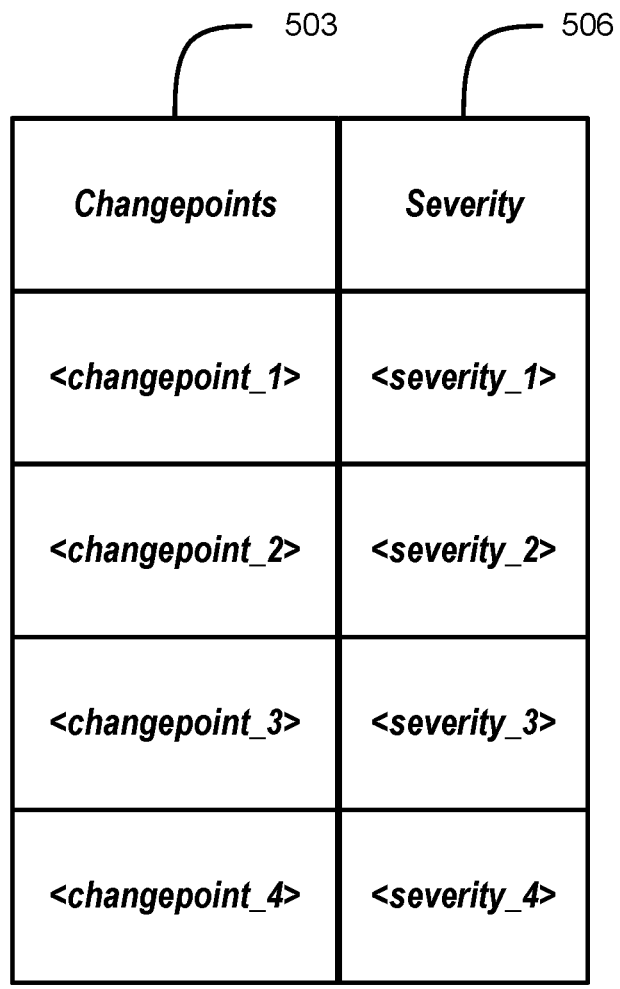
FIG. 5 illustrates a data structure illustrating change point severity, in accordance with one or more embodiments.

FIG. 5 illustrates a data structure 500 illustrating change point severity, in accordance with one or more embodiments. Data structure 500 may include change points 503 and severity metrics 506. For example, change points 503 may be assigned severity metrics 506 based on a performance difference between a first performance level of a first model and a second corresponding performance level of each second corresponding model for the corresponding change point. In some embodiments, change points 503 may correspond to change points illustrated by graph 400, as shown in FIG. 4. For example, state change 412 may correspond to a first change point of change points 503, state change 415 may correspond to a second change point of change points 503, and so on.

Severity assignment subsystem 118 may select, based on the plurality of severity metrics associated with the plurality of change points, a subset of change points of the plurality of change points. Severity assignment subsystem 118 may rank the plurality of change points in order from highest to lowest severity metrics, and severity assignment subsystem 118 may select the subset to include the change points having the highest severity metrics. For example, the subset may include change points, for a group of students, representing the most severe shifts in test scores over time. For example, the subset may include change points representing the most severe changes in test scores within the dataset (e.g., from 70's to 90's). In some embodiments, severity assignment subsystem 118 may rank change points 503 according to severity metrics 506, from highest to lowest. Severity assignment subsystem 118 may select the change points having severity metrics satisfying a certain threshold. In some embodiments, severity assignment subsystem 118 may select a certain number of change points having the highest severity metrics. In some embodiments, severity assignment subsystem 118 may select the subset using other criteria.

Data shift determination system 102 (e.g., communication subsystem 112) may determine, for each change point in the subset of change points, an indication of a cause of each change point. For example, communication subsystem 112 may utilize a comparison modelling system to determine the cause of each change point. An example of a comparison modelling system is further discussed in U.S. Pat. No. 10,839,318, which is hereby incorporated in its entirety. Utilizing the comparison modelling system to determine the cause of each change point may involve selecting samples of user data to input into the comparison modelling system. For example, communication subsystem 112 may select, for a first change point of the subset of change points, a first sample of user data before the first change point and a second sample of the user data after the first change point. The first sample may include a certain number of timestamps before the change point and the second sample may include a certain number of timestamps after the change point. For example, the first sample may include a certain number of test scores before the change point and the second sample may include a certain number of test scores after the change point. The first sample and the second sample may satisfy a minimum sample size and may not exceed a maximum sample size. The minimum sample size and the maximum sample size may be predetermined or may be received from an external source. In some embodiments, the minimum sample size may be required by the comparison modelling system in order to ensure accuracy of the comparison modelling system output. In some embodiments, the maximum sample size may ensure that the comparison modelling system is able to pinpoint the cause of the change point without noise introduced by a sample size that is too large.

Machine learning subsystem 114 may input the first sample and the second sample into the comparison modelling system to cause the comparison modelling system to generate a population shift related to the first sample and the second sample. Population shift may represent differences between values of the predicted and actual datasets. For example, in the example of test scores, population shift may be caused by decreased study time, more challenging material, external forces, or other causes. In some embodiments, inputting the first and second samples may cause the comparison modelling system to generate a performance shift related to the first sample and the second sample. Performance shift may represent differences between the predicted and actual datasets that are not attributable to the population shift. In some embodiments, performance shift may be characterized by changes in selected features between the predicted and actual datasets, reflecting a change in performance. For example, performance shift may represent model error of one or more machine learning models in data shift determination system 102. Machine learning subsystem 114 may receive, from the comparison modelling system, a population shift, a performance shift, an aggregation of population shift and performance shift, or some other metric.

Communication subsystem 112 may determine, based on the population shift, for example, features within user data associated with the dataset that may have had the greatest impact on the change points. For example, communication subsystem 112 may determine one or more features within the user data having the largest changes from before the change point to after the change point. As an example, communication subsystem 112 may determine, based on the output from the comparison modelling system, that one or more features (e.g., study time, difficulty of material, external forces) changed significantly from before the change point to after the change point. As an example, communication subsystem 112 may receive, from the comparison modelling system, indications of study time, difficulty of material, sleep time, other coinciding exams, other coinciding events, personal circumstances, or other features contributing to a particular change point. Communication subsystem 112 may determine that study time changed most drastically from before the particular change point to after the particular change point. Communication subsystem 112 may determine the feature or features causing each change point. Communication subsystem 112 may rank indications of the one or more features according to severity metrics associated with the subset of change points. Communication subsystem 112 may rank the indications of the features identified as causing the change points according to the severity of the corresponding change points. Communication subsystem 112 may then generate for display the ranked plurality of indications.

In some embodiments, data shift determination system 102 may rule out anomalies from the plurality of change points. For example, communication subsystem 112 may identify a state change within the time series dataset based on a first change point. For example, a state change may be a significant transition or shift in the underlying behavior, pattern, or properties of the data at a particular time. The state change may indicate a timestamp at which there is a notable change in the characteristics, structure, or dynamics of the time series. Data shift determination system 102 may determine a duration associated with the state change. For example, data shift determination system 102 may determine a first timestamp at which the state change begins and a second timestamp at which the time series data returns to the state from before the state change. As shown in FIG. 4, state change 409 may have a shorter duration than state change 412 or state change 415 based on time 403.

Data shift determination system 102 may then determine whether a direction of time between the first and second timestamps meets a threshold duration. The threshold duration may represent a minimum duration of time for a state change to be considered a change point. For durations not meeting the threshold duration, data shift determination system 102 may determine that corresponding state changes are anomalies rather than change points. As an example, a change in test scores followed by a quick return to normal may be considered an anomaly rather than a change point with an underlying cause. If data shift determination system 102 determines that the state change does not meet the threshold duration, data shift determination system 102 may label the first change point as an anomaly. Data shift determination system 102 may determine that state change 409 is an anomaly rather than a change point. For example, state change 409 may represent a test that was incorrectly graded or that had an instruction error. Data shift determination system 102 may then exclude the anomaly from the plurality of change points.

In some embodiments, the time series dataset discussed herein may be one of a plurality of time series datasets relating to a plurality of users (e.g., students). Communication subsystem 112 may generate a corresponding plurality of severity metrics for each time series dataset of the plurality of time series datasets (e.g., as previously described). Communication subsystem 112 may then select, based on the severity metrics of each time series dataset, a subset of users. For example, communication subsystem 112 may select a subset of the students based on those students being associated with time series datasets having the highest severity metrics. Communication subsystem 112 may thus select a subset of students involved in the most severe changes in test scores. Communication subsystem 112 may then rank the subset of users based on one or more criteria received from an external source. For example, communication subsystem 112 may receive criteria indicating risk (e.g., risk of failing, risk of dropping out, or other risk). The criteria may include age, socioeconomic background, involvement in school activities, or other criteria. Communication subsystem 112 may use these criteria to rank the students. The ranking may, for example, indicate students requiring the most immediate attention or resources.

Computing Environment

Figure 6:
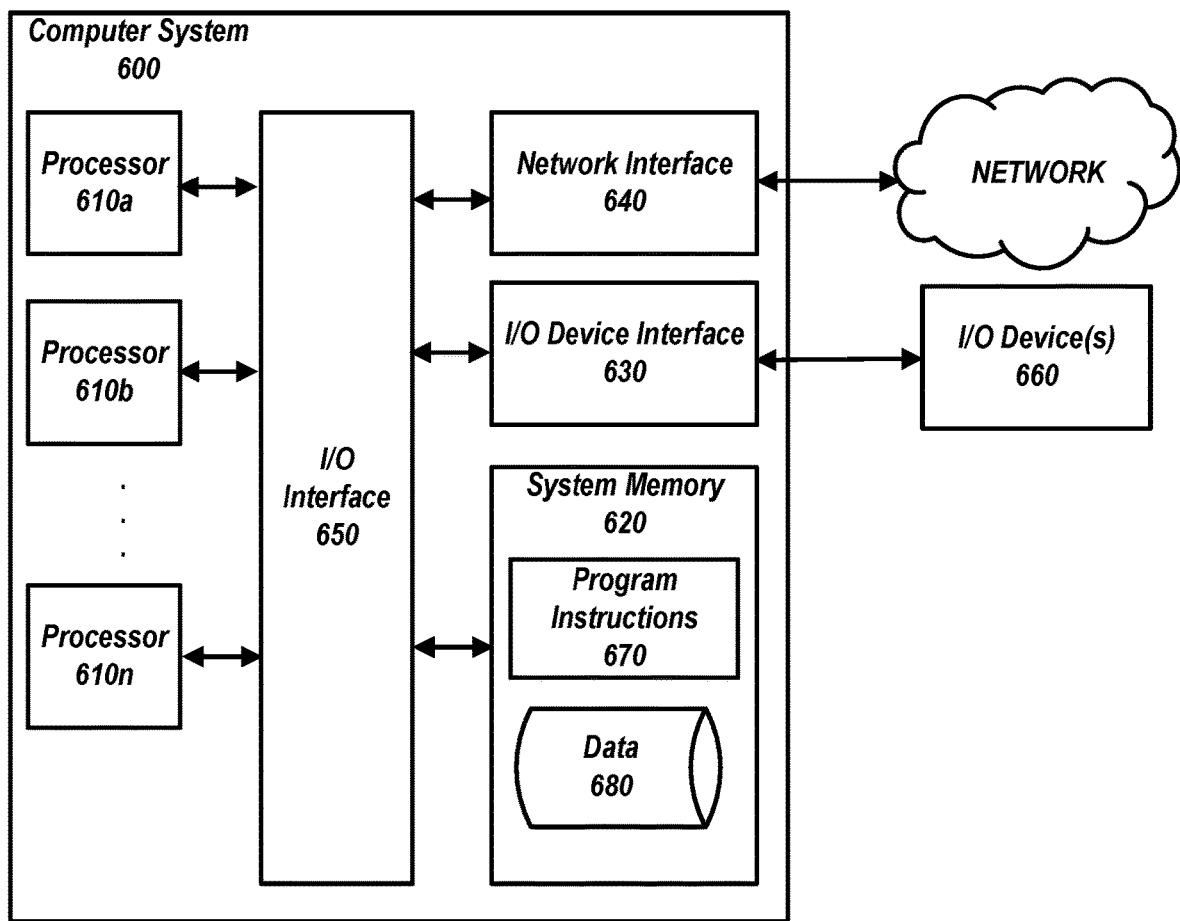
FIG. 6 illustrates a computing device, in accordance with one or more embodiments.

FIG. 6 shows an example computing system 600 that may be used in accordance with some embodiments of this disclosure. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, for example, an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computing system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computing system 600 through a wired or wireless connection. I/O devices 660 may be connected to computing system 600 from a remote location. I/O devices 660 located on remote computer systems, for example, may be connected to computing system 600 via a network and network interface 640.

Network interface 640 may include a network adapter that provides for connection of computing system 600 to a network. Network interface 640 may facilitate data exchange between computing system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 600, or multiple computer systems 600 configured to host different portions or instances of embodiments. Multiple computer systems 600 may provide for parallel or sequential processing/execution of one or more portions of the techniques described herein.

Those skilled in the art will appreciate that computing system 600 is merely illustrative, and is not intended to limit the scope of the techniques described herein. Computing system 600 may include any combination of devices or software that may perform or otherwise provide for the performance of the techniques described herein. For example, computing system 600 may include or be a combination of a cloud-computing system, a data center, a server rack, a server, a virtual server, a desktop computer, a laptop computer, a tablet computer, a server device, a user device, a mobile telephone, a personal digital assistant (PDA), a mobile audio or video player, a game console, a vehicle-mounted computer, a Global Positioning System (GPS), or the like. Computing system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 7:
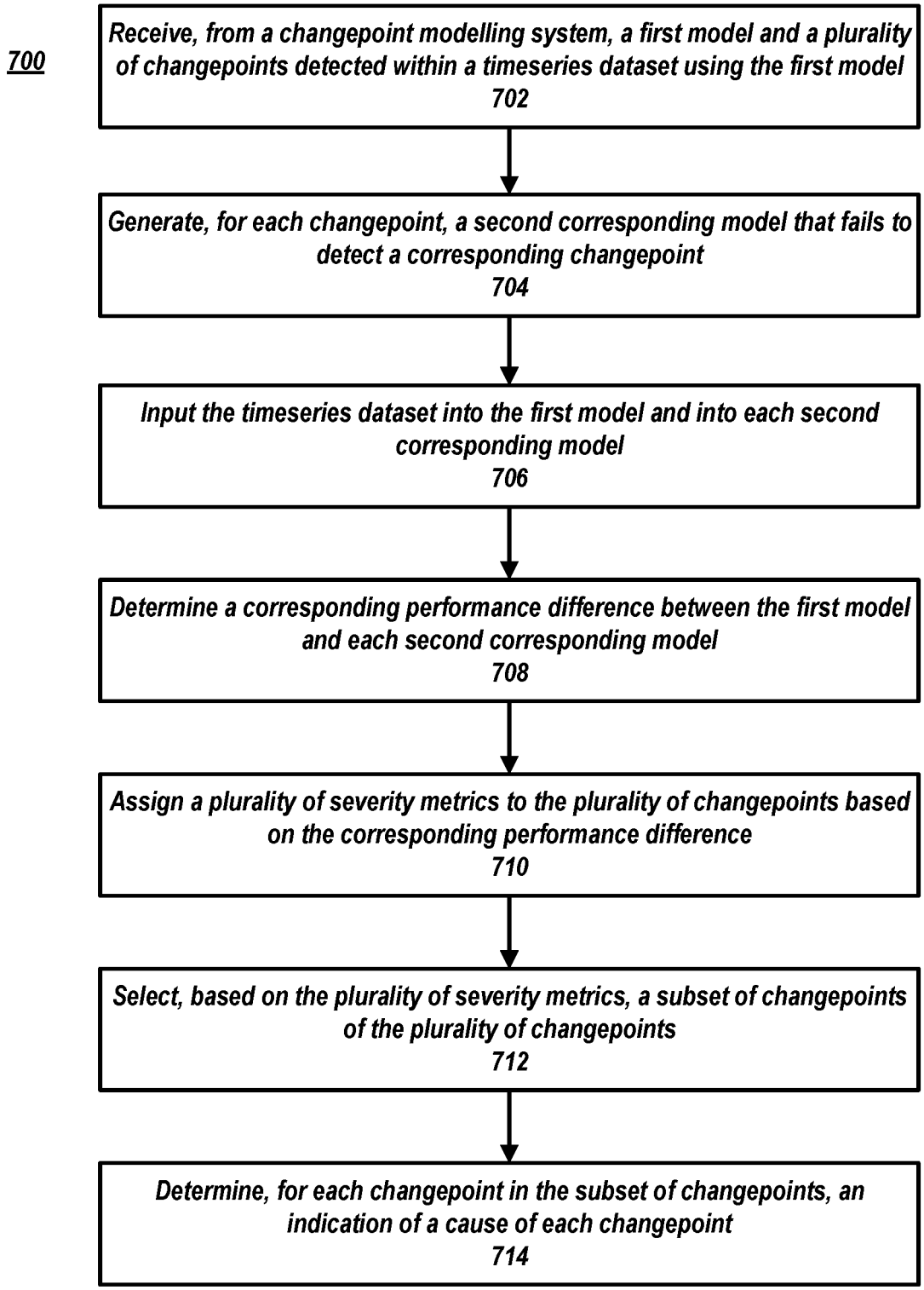
FIG. 7 shows a flowchart of the process for determining causes of change points in time series datasets, in accordance with one or more embodiments.

FIG. 7 shows a flowchart of the process 700 for determining causes of change points in time series datasets, in accordance with one or more embodiments. For example, the system may use process 700 (e.g., as implemented on one or more system components described above) to determine a data change causing each change point in a time series dataset.

At 702, data shift determination system 102 (e.g., using one or more of processors 610a-610n) may receive, from a change point modelling system, a first model and a plurality of change points detected within a time series dataset using the first model. Each change point may indicate a change in a statistical property within the time series dataset. The dataset may represent test scores associated with a group of students. Each change point may represent a statistically significant change in the test scores over time. For example, a particular student who was receiving scores in the 70's is now receiving scores in the 90's. The first model may be trained to optimally model the test scores including all change points. In some embodiments, data shift determination system 102 (e.g., communication subsystem 112) may receive the time series dataset from system memory 620, via the network, or elsewhere.

At 704, data shift determination system 102 (e.g., using one or more of processors 610a-610n) may generate, for each change point, a second corresponding model that fails to detect a corresponding change point. In addition, each second corresponding model may detect other change points in the time series dataset. For example, a second corresponding model may fail to detect a particular change point representing the shift from scores in the 70's to scores in the 90's but may detect other change points within the dataset. For example, each second corresponding model may attempt to model the test scores without accounting for a particular change point. Thus, the second corresponding models may suboptimally model the time series data. In some embodiments, data shift determination system 102 (e.g., machine learning subsystem 114) may generate the second corresponding models using one or more of processors 610a-610n.

At 706, data shift determination system 102 (e.g., using one or more of processors 610a-610n) may input the time series dataset into the first model and into each second corresponding model. In some embodiments, inputting the dataset into the models may cause the first model and each second corresponding model to perform change point detection for the corresponding change point within the time series dataset. In some embodiments, the first model and each second corresponding model may attempt to model the time series dataset. For example, the first model and a second corresponding model may attempt to model a portion of the time series dataset corresponding to a particular change point. For the particular change point, the first model may describe the dataset more accurately than the second corresponding model, which does not detect the particular change point, and thus the first model may perform better. In some embodiments, data shift determination system 102 (e.g., machine learning subsystem 114) may input the dataset into the models using one or more of processors 610a-610n.

At 708, data shift determination system 102 (e.g., using one or more of processors 610a-610n) may determine a corresponding performance difference between the first model and each second corresponding model. Data shift determination system 102 may determine, based on a first model output of the first model and each second model output of each second corresponding model, a first performance level of the first model and a second corresponding performance level of each second corresponding model. The performance level may be measured using a statistical method of quantifying model error. As an example, data shift determination system 102 may determine how well the first model is able to model the test scores chronologically adjacent to the particular change point as compared to how well the second corresponding model is able to model those test scores. For example, performance level may be measured using a statistical method of quantifying model error. In some embodiments, data shift determination system 102 (e.g., performance determination subsystem 116) may determine the corresponding performance difference using one or more of processors 610a-610n.

At 710, data shift determination system 102 (e.g., using one or more of processors 610a-610n) may assign a plurality of severity metrics to the plurality of change points based on the corresponding performance difference. For example, the data shift determination system may determine a difference, for each change point, in the ability of the first model to model the test scores surrounding a corresponding change point as compared to how well the second corresponding model is able to model those test scores. Larger performance differences may reflect more drastic change points (e.g., shifts from scores in the 70's to scores in the 90's), and smaller performance differences may reflect less drastic change points (e.g., shifts from scores in the 70's to scores in the 80's). Based on the difference for each change point, the data shift determination system may assign a corresponding severity metric to each change point. The severity metric may be proportional to the difference for each change point. That is, higher severity metrics may be assigned to change points having higher differences between the first performance level and the second corresponding performance level. For example, if one student's test scores change from 70's to 90's and another student's test scores change from 70's to 80's, those changes may have different severity implications. In some embodiments, data shift determination system 102 (e.g., severity assignment subsystem 118) may assign the severity metrics using one or more of processors 610a-610n.

At 712, data shift determination system 102 (e.g., using one or more of processors 610a-610n) may select, based on the plurality of severity metrics, a subset of change points of the plurality of change points. For example, data shift determination system 102 may select the change points having the highest severity metrics to be included in the subset of change points. The subset may thus include those change points that are most severe and may need the most immediate attention. For example, the subset may include change points representing the most severe changes in test scores within the dataset (e.g., from 70's to 90's). In some embodiments, data shift determination system 102 (e.g., severity assignment subsystem 118) may select the subset of change points using one or more of processors 610a-610n.

At 714, data shift determination system 102 (e.g., using one or more of processors 610a-610n) may determine, for each change point in the subset of change points, an indication of a cause of each change point. For example, data shift determination system 102 may input, into a comparison modelling system, samples of the time series dataset from before and after a particular change point to cause the comparison modelling system to output a population shift related to the change point. In some embodiments, data shift determination system 102 (e.g., machine learning subsystem 114) may determine the cause of each change point using one or more of processors 610a-610n.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising receiving, from a change point modelling system, a first model trained to detect a plurality of change points within a time series dataset and the plurality of change points detected within the time series dataset using the first model, generating, for each change point, a second corresponding model, wherein each second corresponding model fails to detect a corresponding change point, inputting the time series dataset into the first model and into each second corresponding model, determining, for the first model and each second corresponding model, a corresponding performance difference between a first performance level of the first model and a second corresponding performance level of each second corresponding model, assigning a plurality of severity metrics to the plurality of change points, wherein each severity metric of the plurality of severity metrics is assigned to a corresponding change point of the plurality of change points based on the corresponding performance difference, selecting, based on the plurality of severity metrics associated with the plurality of change points, a subset of change points of the plurality of change points, and determining, for each change point in the subset of change points, an indication of a cause of each change point.
2. The method of any one of the preceding embodiments, further comprising identifying a state change within the time series dataset based on a first change point, determining that a duration associated with the state change does not meet a threshold duration, labelling, based on determining that the duration associated with the state change does not meet the threshold duration, the first change point as an anomaly, and excluding the anomaly from the plurality of change points.
3. The method of any one of the preceding embodiments, further comprising identifying a plurality of users having a common metric, wherein the common metric is generated based on a rule, and generating, for the plurality of users, a plurality of time series datasets, wherein each time series dataset of the plurality of time series datasets is related to the common metric, the plurality of time series datasets comprising the time series dataset.
4. The method of any one of the preceding embodiments, further comprising generating a corresponding plurality of severity metrics for each time series dataset of the plurality of time series datasets, selecting, based on each corresponding plurality of severity metrics, a subset of users of the plurality of users, and ranking the subset of users based on one or more criteria received from an external source.
5. The method of any one of the preceding embodiments, wherein generating, for each change point, the second corresponding model comprises generating the second corresponding model that detects other change points of the plurality of change points in the time series dataset and that fails to detect the corresponding change point.
6. The method of any one of the preceding embodiments, wherein generating the second corresponding model comprises selecting a model that detects a highest number of the other change points.
7. The method of any one of the preceding embodiments, wherein determining the corresponding performance difference comprises receiving a first residual value as a first output from the first model, receiving a second corresponding residual value as a second output from each second corresponding model, and determining the corresponding performance difference for each second corresponding model by comparing the first residual value with each second corresponding residual value.
8. The method of any one of the preceding embodiments, wherein determining the cause of each change point comprises selecting, for a first change point of the subset of change points, a first sample of user data before the first change point and a second sample of the user data after the first change point.

9. The method of any one of the preceding embodiments, wherein the first sample and the second sample satisfy a minimum sample size and do not exceed a maximum sample size, wherein the minimum sample size and the maximum sample size are received from an external source.

10. The method of any one of the preceding embodiments, further comprising inputting the first sample and the second sample into a comparison modelling system to cause the comparison modelling system to generate a population shift related to the first sample and the second sample, and determining, based on the population shift, one or more features within the user data with largest changes.

11. The method of any one of the preceding embodiments, further comprising determining, based on the one or more features, the cause of each change point in the subset of change points.

12. The method of any one of the preceding embodiments, further comprising determining, for each change point in the subset of change points, a corresponding plurality of features that cause each change point, ranking, according to a plurality of severity metrics associated with the subset of change points, a plurality of indications of the corresponding plurality of features that cause each change point of the subset of change points, and generating for display the ranked plurality of indications.

13. A tangible, non-transitory, machine-readable medium storing instructions that, when executed by a data processing apparatus, cause the data processing apparatus to perform operations comprising those of any of embodiments 1-12.

14. A system comprising one or more processors and memory storing instructions that, when executed by the processors, cause the processors to effectuate operations comprising those of any of embodiments 1-12.

15. A system comprising means for performing any of embodiments 1-12.

16. A system comprising cloud-based circuitry for performing any of embodiments 1-12.

What is claimed is:

1. A system for determining causes of a plurality of change points in a time series dataset, the system comprising:
one or more processors, at least one memory, and one or more computer-readable media having computer-executable instructions stored thereon, the computer-executable instructions, when executed by the one or more processors, causing the system to perform operations comprising:
receiving, from a change point modelling system, a first model trained to detect the plurality of change points within the time series dataset and the plurality of change points detected within the time series dataset using the first model, wherein the plurality of change points include a change point that indicates a change in a statistical property within the time series dataset;
generating, for the plurality of change points, second corresponding models, wherein the second corresponding models include a second corresponding model that fails to detect the change point and detects other change points in the time series dataset;
inputting, into the first model and into the second corresponding model, the time series dataset to cause the first model and the second corresponding model to perform change point detection for the change point within the time series dataset;
determining, based on a first model output of the first model and a second model output of the second corresponding model, a first performance level of the first model and a second corresponding performance level of the second corresponding model;
assigning, to the change point, a severity metric based on a corresponding performance difference between the first performance level and the second corresponding performance level, wherein the severity metric represents an impact of the change point on an ability of the second corresponding model to accurately represent the time series dataset;
selecting, based on severity metrics associated with the plurality of change points, a subset of change points of the plurality of change points, wherein the severity metrics include the severity metric; and
determining, for each change point in the subset of change points, an indication of a data change causing each change point.

2. The system of claim 1, wherein the second corresponding model detects highest number of the other change points.

3. A method comprising:
receiving, from a change point modelling system, a first model trained to detect a plurality of change points within a time series dataset and the plurality of change points detected within the time series dataset using the first model;
selecting, for each change point, a second corresponding model fails to detect a corresponding change point and detects highest number of other change points of the plurality of change points;
inputting the time series dataset into the first model and into each second corresponding model;
determining, for the first model and each second corresponding model, a corresponding performance difference between a first performance level of the first model and a second corresponding performance level of each second corresponding model;
assigning a plurality of severity metrics to the plurality of change points, wherein each severity metric of the plurality of severity metrics is assigned to a corresponding change point of the plurality of change points based on the corresponding performance difference;
selecting, based on the plurality of severity metrics associated with the plurality of change points, a subset of change points of the plurality of change points; and
determining, for each change point in the subset of change points, an indication of a cause of each change point.

4. The method of claim 3, further comprising:
identifying a state change within the time series dataset based on a first change point;
determining that a duration associated with the state change does not meet a threshold duration;
labelling, based on determining that the duration associated with the state change does not meet the threshold duration, the first change point as an anomaly; and
excluding the anomaly from the plurality of change points.

5. The method of claim 3, further comprising:
identifying a plurality of users having a common metric, wherein the common metric is generated based on a rule; and
generating, for the plurality of users, a plurality of time series datasets, wherein each time series dataset of the plurality of time series datasets is related to the common metric, the plurality of time series datasets comprising the time series dataset.

6. The method of claim 5, further comprising:
generating a corresponding plurality of severity metrics for each time series dataset of the plurality of time series datasets;
selecting, based on each corresponding plurality of severity metrics, a subset of users of the plurality of users; and
ranking the subset of users based on one or more criteria received from an external source.

7. The method of claim 3, further comprising:
generating the second corresponding model.

8. The method of claim 3, wherein determining the corresponding performance difference comprises:
receiving a first residual value as a first output from the first model;
receiving a second corresponding residual value as a second output from each second corresponding model; and
determining the corresponding performance difference for each second corresponding model by comparing the first residual value with each second corresponding residual value.

9. The method of claim 3, wherein determining the cause of each change point comprises selecting, for a first change point of the subset of change points, a first sample of user data before the first change point and a second sample of the user data after the first change point.

10. The method of claim 9, wherein the first sample and the second sample satisfy a minimum sample size and do not exceed a maximum sample size, wherein the minimum sample size and the maximum sample size are received from an external source.

11. The method of claim 9, further comprising:
inputting the first sample and the second sample into a comparison modelling system to cause the comparison modelling system to generate a population shift related to the first sample and the second sample; and
determining, based on the population shift, one or more features within the user data with largest changes.

12. The method of claim 11, further comprising determining, based on the one or more features, the cause of each change point in the subset of change points.

13. The method of claim 12, further comprising:
determining, for each change point in the subset of change points, a corresponding plurality of features that cause each change point;
ranking, according to a plurality of severity metrics associated with the subset of change points, a plurality of indications of the corresponding plurality of features that cause each change point of the subset of change points; and
generating for display the ranked plurality of indications.

14. One or more non-transitory, computer-readable media storing instructions that, when executed by one or more processors, cause the one or more processors to perform operations comprising:
receiving, from a change point modelling system, a first model trained to detect a plurality of change points within a time series dataset and the plurality of change points detected within the time series dataset using the first model;
generating, for each change point, a second corresponding model, wherein each second corresponding model fails to detect a corresponding change point;

inputting the time series dataset into the first model and into each second corresponding model;
determining, based on the first model and each second corresponding model processing the time series dataset, a corresponding performance difference between a first performance level of the first model and a second corresponding performance level of each second corresponding model;
assigning a plurality of severity metrics to the plurality of change points, wherein each severity metric of the plurality of severity metrics is assigned to a corresponding change point of the plurality of change points based on the corresponding performance difference;
selecting, based on the plurality of severity metrics associated with the plurality of change points, a subset of change points of the plurality of change points; and
determining, for each change point in the subset of change points, a cause of each change point,
wherein determining the cause of each change point comprises selecting, for a first change point of the subset of change points, a first sample of user data before the first change point and a second sample of the user data after the first change point, and
wherein the first sample and the second sample satisfy a minimum sample size.

15. The one or more non-transitory, computer-readable media of claim 14, wherein the instructions further cause the one or more processors to perform operations comprising:
identifying a state change within the time series dataset;
determining that a duration associated with the state change does not meet a threshold duration;
labeling, based on determining that the duration associated with the state change does not meet the threshold duration, an anomaly; and
excluding the anomaly from the plurality of change points.

16. The one or more non-transitory, computer-readable media of claim 14, wherein the instructions further cause the one or more processors to perform operations comprising:
identifying a plurality of users having a common metric, wherein the common metric is generated based on a rule; and
generating, for the plurality of users, a plurality of time series datasets, wherein each time series dataset of the plurality of time series datasets is related to the common metric, the plurality of time series datasets comprising the time series dataset.

17. The one or more non-transitory, computer-readable media of claim 16, wherein the instructions further cause the one or more processors to perform operations comprising:
generating a corresponding plurality of severity metrics for each time series dataset of the plurality of time series datasets;
selecting, based on each corresponding plurality of severity metrics, a subset of users of the plurality of users; and
ranking the subset of users based on one or more criteria received from an external source.

18. The one or more non-transitory, computer-readable media of claim 14, wherein the instructions for generating, for each change point, the second corresponding model further cause the one or more processors to perform operations comprising generating the second corresponding model that detects other change points of the plurality of change points in the time series dataset and that fails to detect the corresponding change point.

19. The one or more non-transitory, computer-readable media of claim 18, wherein the instructions for generating the second corresponding model further cause the one or more processors to perform operations comprising selecting a model that detects a highest number of the other change points.

20. The one or more non-transitory, computer-readable media of claim 14, wherein the instructions for determining the corresponding performance difference further cause the one or more processors to perform operations comprising:
   receiving a first residual value as a first output from the first model;
   receiving a second corresponding residual value as a second output from each second corresponding model; and
   determining the corresponding performance difference for each second corresponding model by comparing the first residual value with each second corresponding residual value.

* * * * *